(12) United States Patent
Finch et al.

(10) Patent No.: US 11,906,147 B2
(45) Date of Patent: Feb. 20, 2024

(54) ILLUMINATION DEVICES

(71) Applicant: Brightz, Ltd., Ottawa Lake, MI (US)

(72) Inventors: Brian Finch, Ypsilanti, MI (US); Samantha Dickie, Canton, MI (US)

(73) Assignee: Brightz, Ltd., Ottawa Lake, MI (US)

( * ) Notice: Subject to any disclaimer, the term of this patent is extended or adjusted under 35 U.S.C. 154(b) by 0 days.

(21) Appl. No.: 18/112,939

(22) Filed: Feb. 22, 2023

(65) Prior Publication Data
US 2023/0265987 A1 Aug. 24, 2023

Related U.S. Application Data

(60) Provisional application No. 63/312,646, filed on Feb. 22, 2022.

(51) Int. Cl.
| | | |
|---|---|---|
| *F21V 3/02* | (2006.01) | |
| *F21V 7/04* | (2006.01) | |
| *F21V 21/08* | (2006.01) | |
| *F21V 23/00* | (2015.01) | |
| *F21V 23/04* | (2006.01) | |
| *F21L 4/02* | (2006.01) | |

(52) U.S. Cl.
CPC ............... *F21V 3/02* (2013.01); *F21L 4/02* (2013.01); *F21V 7/041* (2013.01); *F21V 21/0816* (2013.01); *F21V 23/009* (2013.01); *F21V 23/04* (2013.01)

(58) Field of Classification Search
CPC . F21L 4/02; F21L 4/027; F21S 10/023; F21V 13/04; F21V 21/0816; F21V 23/009; F21V 23/04; F21V 3/02; F21V 7/041; F21Y 2105/18
See application file for complete search history.

(56) References Cited

U.S. PATENT DOCUMENTS

| | | | | |
|---|---|---|---|---|
| 9,470,382 B1* | 10/2016 | Sharrah | ................... | H05B 45/10 |
| 9,863,622 B1* | 1/2018 | Armer | ................. | F21V 23/0414 |
| 10,794,578 B2* | 10/2020 | Halliwell | ................ | F21V 17/02 |
| 2015/0335246 A1* | 11/2015 | Rains, Jr. | ............... | F21V 14/003 |
| | | | | 362/231 |
| 2017/0254487 A1* | 9/2017 | Matsubayashi | ............ | F21K 9/61 |
| 2018/0017246 A1* | 1/2018 | Lau | ........................ | F21V 14/065 |
| 2020/0102710 A1* | 4/2020 | Koyle | ..................... | E01F 9/608 |
| 2020/0132259 A1* | 4/2020 | Shima | ..................... | F21V 23/04 |
| 2021/0402040 A1* | 12/2021 | Botts | ...................... | A61B 90/35 |
| 2022/0178522 A1* | 6/2022 | Cabot | ................. | F21V 21/0816 |

FOREIGN PATENT DOCUMENTS

WO WO-2014161255 A1 * 10/2014 ........... F21K 9/1355

* cited by examiner

*Primary Examiner* — Zheng Song
(74) *Attorney, Agent, or Firm* — Dinsmore & Shohl

(57) ABSTRACT

An illumination device including a housing having a flared cylindrical bowl shape enclosed on a first end and open on an second end, a light emitting portion coupled to the housing on the second end, the light emitting portion comprising a first portion configured to diffuse light emitted through the first portion and a second portion configured to project light in a beam from the illumination device, the first portion encircles a perimeter of the second portion, a first light source comprising one or more light emitting devices that when activated provide light to the first portion, and a second light source distinct from the first light source that when activated provides light to the second portion.

20 Claims, 6 Drawing Sheets

ILLUMINATION DEVICES

CROSS-REFERENCE TO RELATED APPLICATION

This application claims priority to U.S. Provisional Application No. 63/312,646 filed Feb. 22, 2022, the disclosure of which is incorporated herein by reference in its entirety.

TECHNICAL FIELD

The present specification relates to illumination devices, and more specifically to selectively attachable illumination devices having a plurality of illumination modes.

BACKGROUND

Flashlights and similar illumination devices have been modified to be capable of mounting on transportation devices such as bicycles to assist a user of the transportation device with seeing the environment in front of them as they operate the transportation device. However, these devices are designed with a specific purpose, to illuminate the ground or objects in front of the user. Transportation devices that utilize such illumination devices are only identified from the adjacent area in which the illumination device illuminates or from viewing the illumination device from within the illumination field of the illumination device. That is, for example the illumination field of the illumination device refers to the field of view that is light source projects light from the illumination device. In general, the illumination field of flashlights are limited and concentrated to a narrow angle so that light generated by the device is projected to illuminated areas in front of the flashlight.

A need exists to for illumination devices capable of selective connection to a transportation device and configured to assist a user in seeing and being seen.

SUMMARY

In one embodiment, an illumination device includes a housing having a flared cylindrical bowl shape enclosed on a first end and open on an second end, a light emitting portion coupled to the housing on the second end, the light emitting portion comprising a first portion configured to diffuse light emitted through the first portion and a second portion configured to project light in a beam from the illumination device, the first portion encircles a perimeter of the second portion, a first light source comprising one or more light emitting devices that when activated provide light to the first portion, and a second light source distinct from the first light source that when activated provides light to the second portion.

In another embodiment, an illumination apparatus for selectively coupling to a transportation device includes a housing having a flared cylindrical bowl shape enclosed on a first end and open on an second end, the housing comprises a cutout portion extending from the second end along a length of the housing toward the first end, an attachment mechanism coupled to the housing, the attachment mechanism configured to selectively fasten the illumination device to the transportation device, a light emitting portion coupled to the housing on the second end, the light emitting portion comprising a first portion configured to diffuse light emitted through the first portion and a second portion configured to project light in a beam from the illumination device, the first portion encircles a perimeter of the second portion, the first portion of the light emitting portion configured to enclose the cutout portion of the housing, a first light source comprising one or more light emitting devices that when activated provide light to the first portion, the light that is diffused by the first portion of the light emitting portion and illuminates the cutout portion of the housing, and a second light source distinct from the first light source that when activated provides light to the second portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
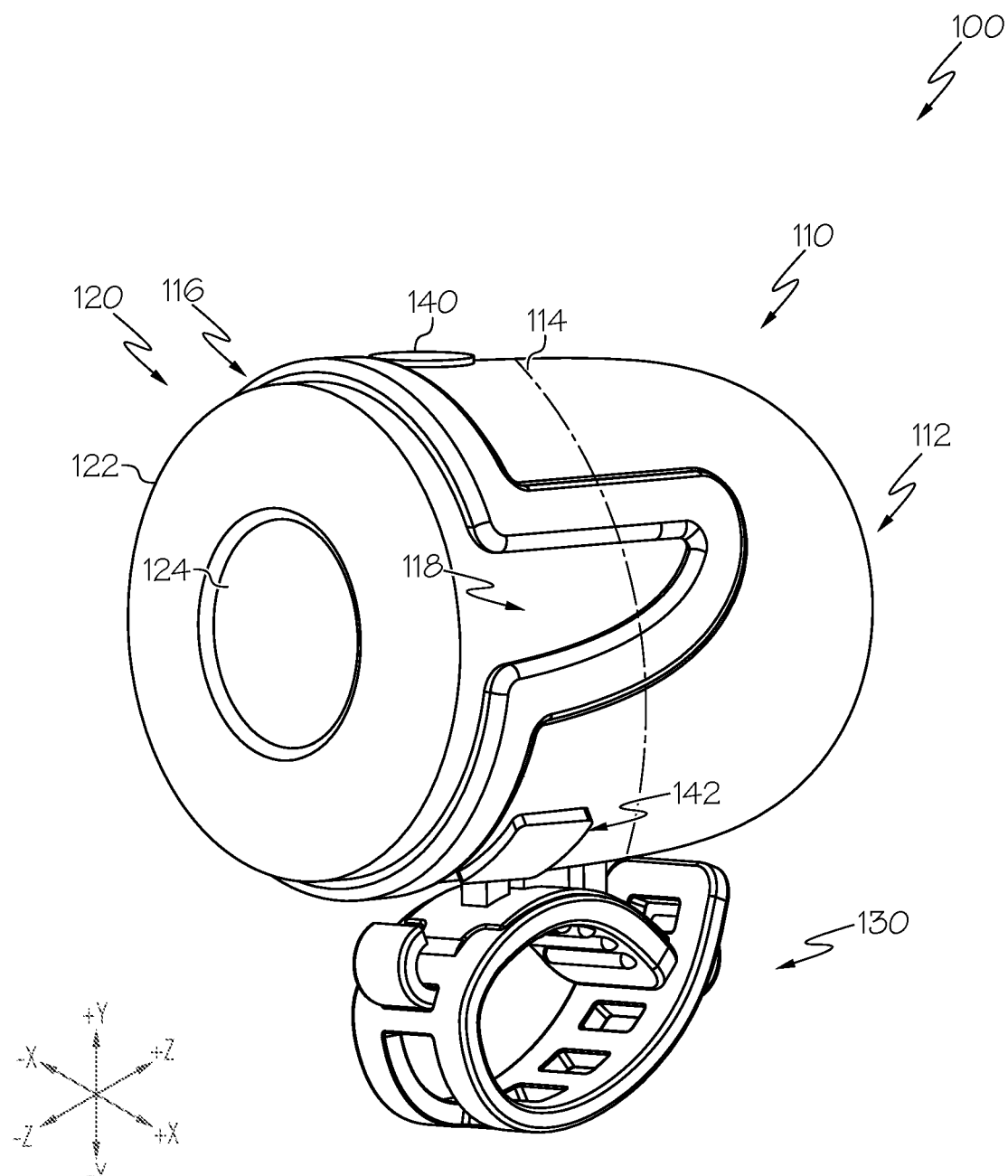
FIG. 1 depicts an illustrative embodiment of an illumination device, according to one or more embodiments shown and described herein.

Embodiments described herein are directed to illumination devices. The illumination devices have unique designs, various illumination modes, and are capable of being attached to a variety of objects such as bicycles, scooters, or the like. Additionally, the illumination devices are capable of providing illumination of a path in front of a user in addition to providing illumination of a user. That is, light that is projected from the illumination device can illuminate a path of the user, while light that is diffused by the illumination device serves as an indicator as to the location of the illumination device and the user.

Embodiments of the illumination devices disclosed herein provide a first source of light so that the user can be seen and a second source of light to a user to see. The first source of light is generated by a first light source that illuminates a semi-transparent and diffuse material. The semi-transparent and diffuse material causes the light to diffuse the light throughout the material thereby causing the light to scatter and operate as a local illuminator that can be seen as opposed to projecting light to illuminate an area and objects around the illumination device. The second source of light is generated by a second light source that is focused, directed, and projected outward from the illumination device to illuminate an area and objects around the illumination device. For example, light projected through the second portion by the second light source forms a beam of light illuminating an area in a longitudinal direction from the illumination device, and light projected through the first portion by the first light source generates with the first portion an illuminated surface with a viewing angle along the longitudinal direction and radially extending from the longitudinal direction.

Some embodiments of the illumination devices further include cutout portions which will be described in more detail herein, which enable light from the first light source to be visible when viewing the illumination devices from the sides. The cutout portions may be formed to illustrate decorative shapes such as stars, flames, or the like which makes the illumination device more attractive and friendly for use by children. That is, the integration of decorations within the illumination device encourage children to use the device and attach it to devices such as their bicycle. Furthermore, the first illumination device may be configured to operate in a variety of modes including changing colors which may not only be appealing to children but also operate to draw attention to the illumination device by others unlike static lighting devices which have the tendency to be ignored and fall into background illumination when viewed by others. In other words, human vision is designed to give attention to movement which is perceived by changes in light intensity and color that hit the receptors of the human eye.

An illumination device employing a light source configured to draw attention to the illumination device through diffused and color changing light while employing a second light source that is projected outward from the device to illuminate an area and objects around the illumination device will now be described in more detail herein. The following will now describe embodiments of illumination devices in detail with reference to the figures.

Turning now to the drawings where like numbers refer to like structures, and particularly to FIG. 1 which depicts an illustrative embodiment of an illumination device 100. The illumination device 100 structurally includes a housing 110, a light emitting portion 120, and an attachment mechanism 130. The housing 110 and the light emitting portion 120 may include two or more components that are fastened together. The housing 110 may be made of a variety of materials including but not limited to plastic, metal, silicone, fiberglass, or the like. The light emitting portion 120, which is described in more detail herein may also be made of a variety of materials including but not limited to plastic, glass, silicone, fiberglass, or the like.

An enclosure is formed when the housing 110 and the light emitting portion 120 are assembled. The illumination device 100 further includes additional components within the enclosure. For example, a power source, a light emitting device, power and control components, a printed circuit board, and/or other components may be positioned within the enclosure. The internal structure of the illumination device 10 will be described in more detail herein.

As used herein a lateral direction is defined along the X-axis, a longitudinal direction is defined along the Y-axis, and a vertical direction is defined along the Z-axis.

In one embodiment, the housing 110 has a flared cylindrical bowl shape. The enclosed end 112 of the housing 110 is generally round in nature having a half-sphere or less than half-sphere contour. Extending from the enclosed end 112 is a cylindrical wall 114. The cylindrical wall 114 has a diameter that gradually increases (e.g. flare) in the direction away from the enclosed end 112 toward an opening 116. The direction from the enclosed end 112 to toward the light emitting portion 120 is referred to herein as the longitudinal direction (along the Z-axis).

Figure 2:
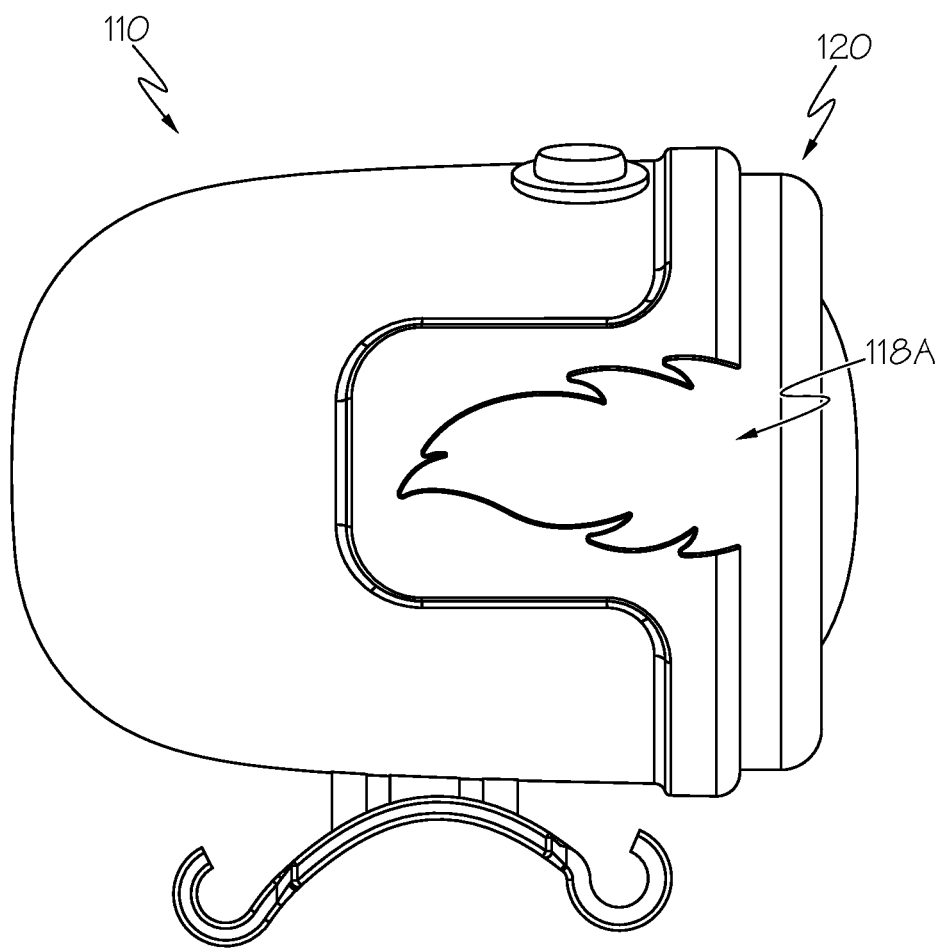
FIG. 2 depicts an illustrative embodiment of an illumination device having an illuminated aesthetic design, according to one or more embodiments shown and described herein.
Figure 3:
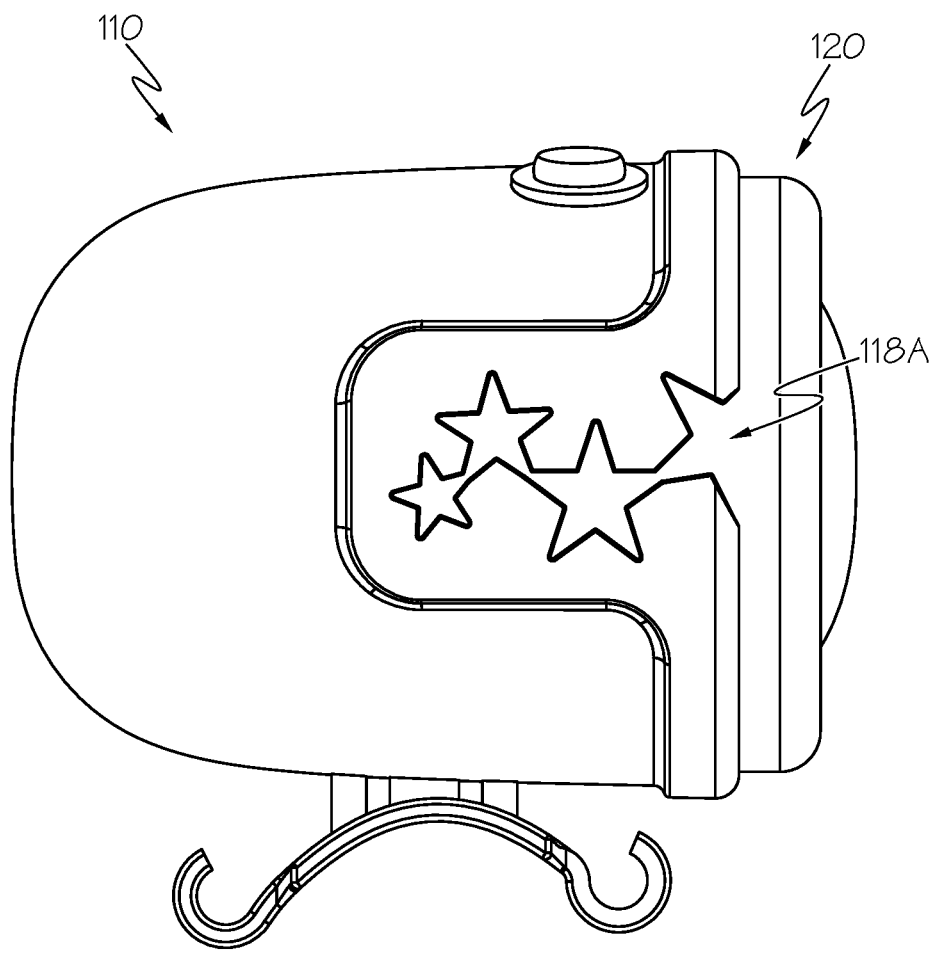
FIG. 3 depicts an illustrative embodiment of an illumination device having another illuminated aesthetic design, according to one or more embodiments shown and described herein.

The perimeter of the opening 116 may extend longitudinally into the cylindrical wall 114 of the housing 110 defining a cavity or cutout portion 118 in the cylindrical wall 114. There may be one or more cutout portions 118 within the cylindrical wall 114 of the housing 110. The cutout portion 118 may have an aesthetically pleasing shape where light generated by the light emitting device within the enclosure can shine through. For example, as depicted in FIG. 1, the cutout portions 118 may include a wedge profile. As depicted in FIG. 2, the cutout portion 118*a* may have a perimeter defining an illustrative flame shape. As depicted in FIG. 3, the cutout portion 118*b* may have define the outline of one or more stars. It should be understood that the cutout portions 118, 118*a*, 118*b* depicted herein are only a few examples of the different outlines that may be formed within the housing 110.

Referring back to FIG. 1, the opening 116 of the housing 110 is configured to receive the light emitting portion 120. The perimeter of the opening 116 may include a stepped or beveled edge that receives a corresponding portion of the light emitting portion 120. The mating of the housing 110 and the light emitting portion 120 may be secured and/or sealed using a glue or other filler material. In some embodiments, the housing 110 and the light emitting portion 120 may be coupled together through an interference fit or fastened to each other through a screw fit or the like. The mating of the housing 110 and the light emitting portion 120 may be accomplished in such a way that tools are not needed to connect or disconnect the components. Accordingly, having a tool free connection enables a user to open the illumination device 100 to change the power source located therein or even interchange a first housing 110 and first light emitting portion 120 with a different housing 110 or light emitting portion 120.

The light emitting portion 120 may include one or more transparent or semi-transparent components. Accordingly, the light emitting portion 120 permits light generated by the light emitting device within the illumination device 100 to be pass there through. The light emitting portion 120, for example, as depicted in FIG. 1, includes a first portion 122 and a second portion 124. The first portion 122 is less transparent than the second portion 124. When the first portion 122 is semi-transparent, light generated by the light emitting device within the illumination device 100 may diffuse or scatter as it passes through the first portion 122 causing the first portion 122 to appear illuminated. When the color of light generated by the light emitting device changes, the first portion 122 may appear to radiate the color of the light. The second portion 124 of the illumination device 100 may be transparent or near transparent such that light generated by the light emitting device pass there through generally unobstructed. In some embodiments, the second portion 124 may be a lens, which can focus or otherwise manipulate the direction of the light passing there through.

In some embodiments, the light emitting portion 120 is generally cylindrical in shape having one enclosed end corresponding to the opening 116 of the housing 110. The surface of the enclosed end may be flat or have a spherical contour. The sides extending from the enclosed end may extend longitudinally toward the enclosed end 112 of the housing 11 thereby covering the cutout portion 118 of the housing 110. Covering the cutout portion 118 of the housing with the light emitting portion 120, for example, from the inside of the housing 110, enables light generated by the light emitting device therein to be illuminated through the cutout portion 118. The enclosed end of the light emitting portion 120 may have a hole in the center portion where the second portion 124 as described above may be located. The second portion 124 may be formed with the first portion 122 of the light emitting portion 120. In some embodiments, the second portion 124 may be a separate component from the first portion 122 that is coupled to opening of the first portion 122 of the light emitting portion 120. The first portion 122 encircles the second portion 124 such that the second portion 124 occupies a central area of the light emitting portion 120 and the first portion 122 defines an outer area or perimeter of the light emitting portion 120. In other words, the first portion 122 forms a halo or ring around the second portion 124, thereby providing illumination in a longitudinal direction and radially extending from a longitudinal axis of the illumination device 100.

In some embodiments, the second portion 124 may be more transparent than the first portion 122. The second portion 124 may be configured to project light in a beam while the first portion 122 diffuses light. The projected light may illuminate a path at a distance of about 50 ft, 75 ft, 100 ft, 150 ft, or 200 ft. In some embodiments, which are described in more detail herein, a first light emitting device may project light through the second portion 124 and one or more second light emitting devices may be configured to project light through the first portion 122. The first light emitting device may generate a first color of light and one or more second light emitting devices may generate light with a second color different from the first color. Operation of the illumination device 100 will be described in more detail herein.

Figure 4:
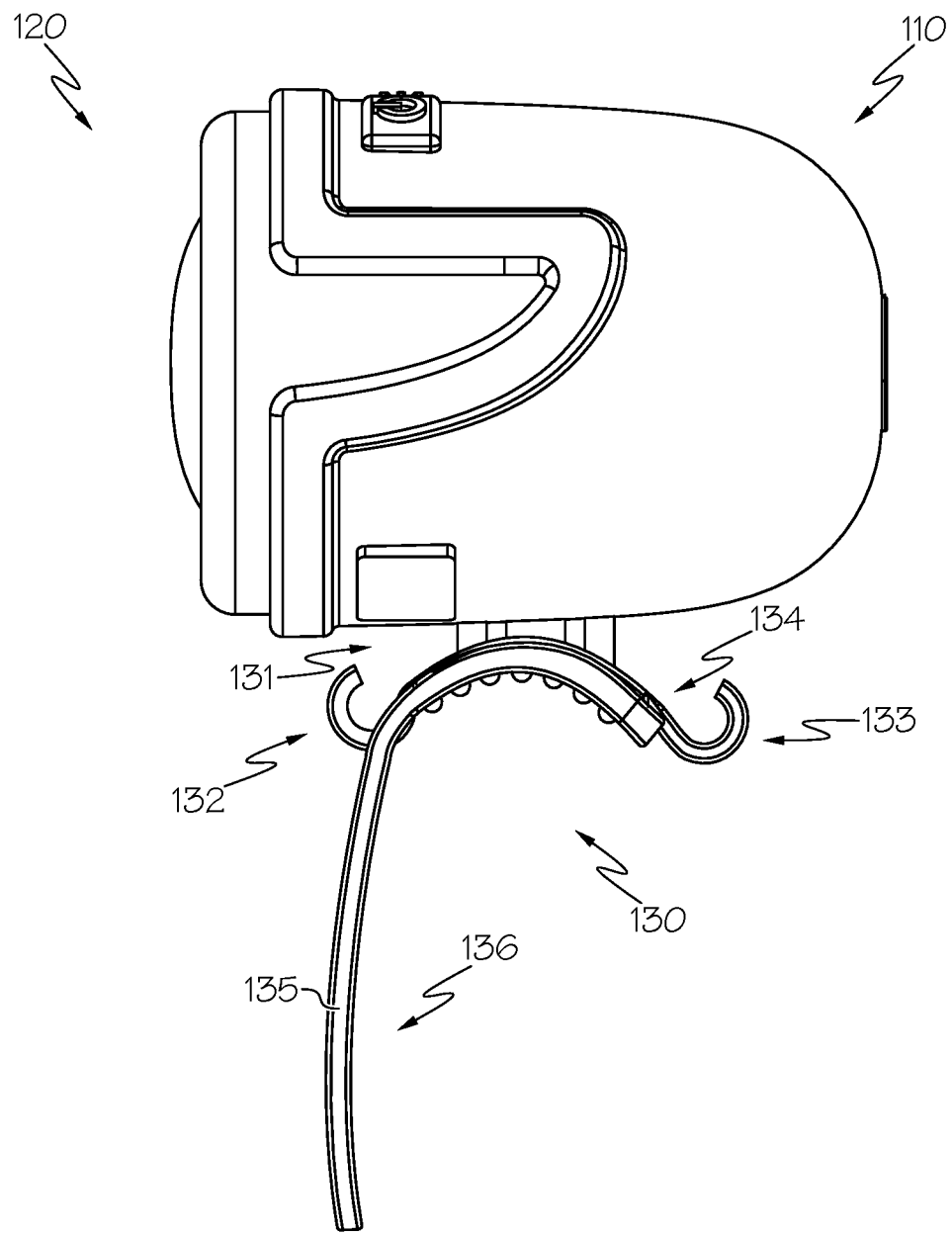
FIG. 4 depicts a side view of the illumination device, according to one or more embodiments shown and described herein.

As depicted in FIGS. 1 and 4, the illumination device 100 further includes an attachment mechanism 130. The attachment mechanism 130 is configured to enable a user to selective connect and disconnect the illumination device 100 from another device, such as the handlebar of a bicycle or a scooter. The attachment mechanism 130 may include one or more components. In some embodiments, the attachment mechanism 130 includes a first portion 131 that is formed with the housing 110. As depicted, a first hook 132 and a second hook 133 are disposed on opposing ends of a member 134. The first hook 132 and the second hook 133 are configured to receive a banding member 135. The banding member 135 comprises a flexible, stretchable material such as a rubber, synthetic-rubber, or other pliable material. The banding member 135 is an elongated member having a plurality of openings 136 configured to receive the first hook 132 and the second hook 133. In operation, a first set of the plurality of openings 136 couples to the first hook 132. A portion of the elongated member may then be wrapped around a handlebar or other structure of an object such as a bicycle, scooter, or the like. A second set of the plurality of openings 136 couples to the second hook 133 thereby coupling the illumination device 100 to the handlebar or other structure of the object.

Figure 5:
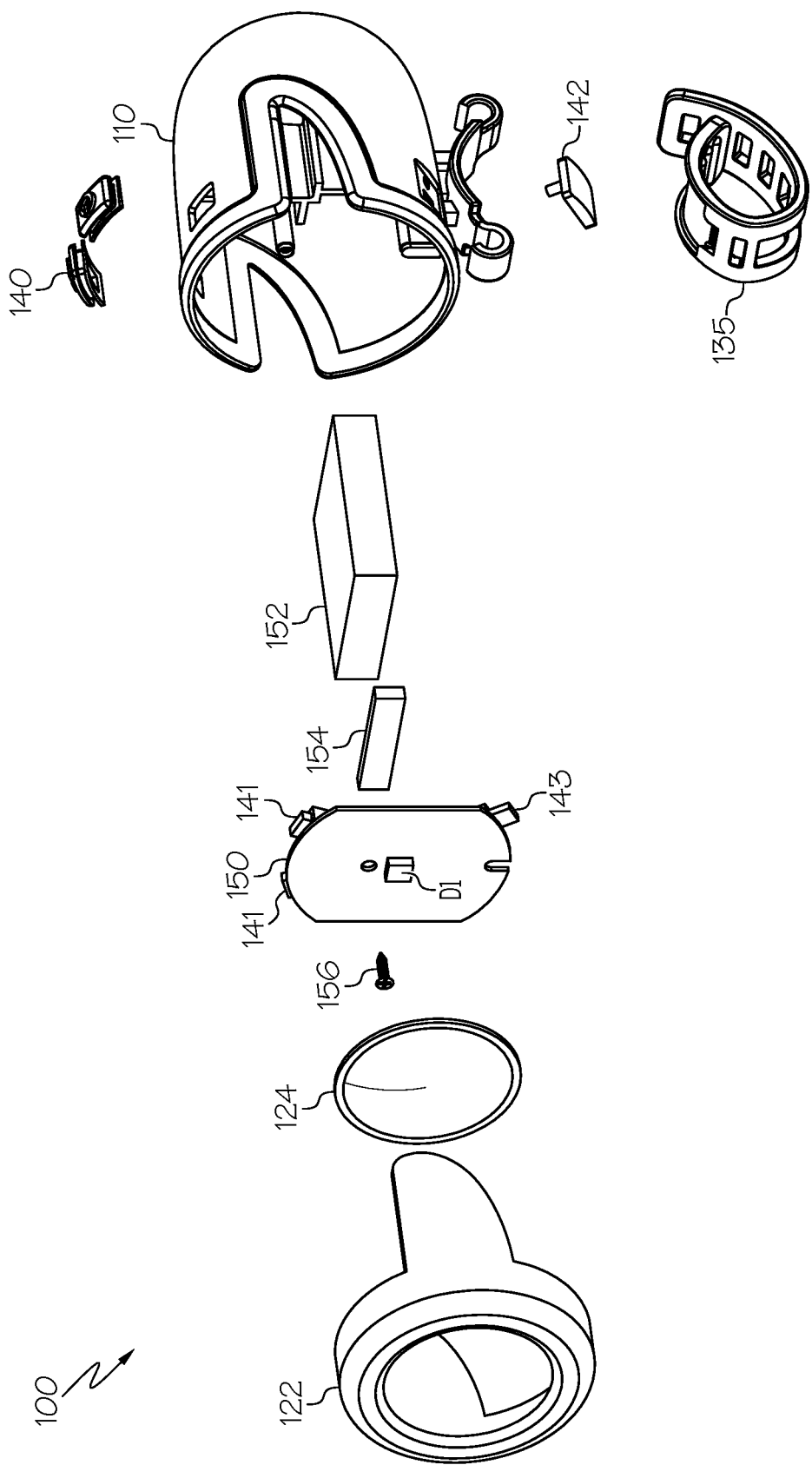
FIG. 5 depicts an illustrative exploded view of an embodiment of the illumination device, according to one or more embodiments shown and described herein.
Figure 6:
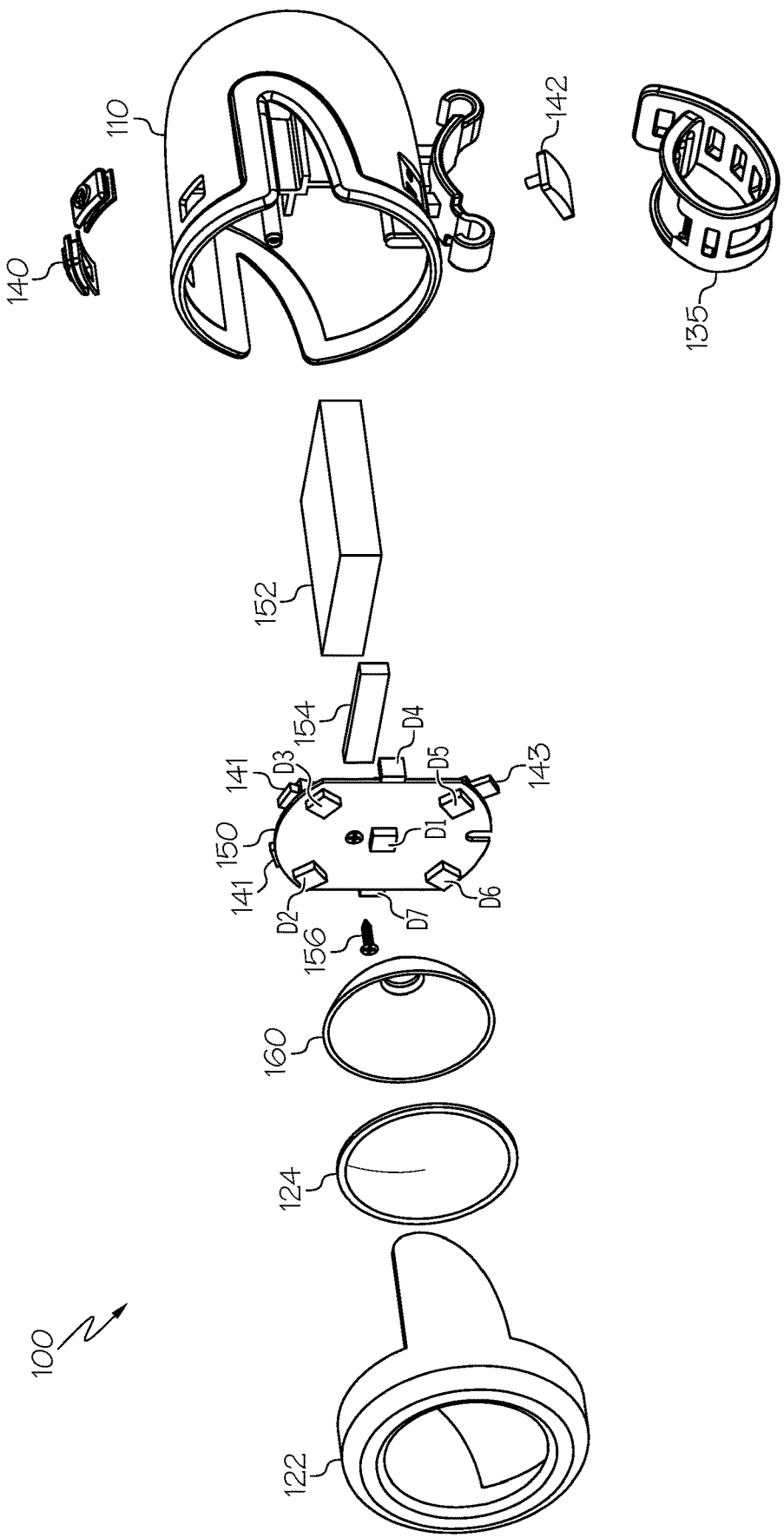
FIG. 6 depicts an illustrative exploded view of another embodiment of the illumination device, according to one or more embodiments shown and described herein.

Turning to FIGS. 5 and 6, two illustrative schematics are depicted of embodiments of the illumination device 100. A first embodiment, for example, the illumination device 100 depicted in FIG. 5, includes a single light emitting device D1. A second embodiment, for example, the illumination device 100 depicted in FIG. 6, include a plurality of light emitting devices D1-D7. Referring to FIG. 5, a printed circuit board (PCB) 150 includes a single light emitting device D1, one or more buttons 141 and a charging port 143.

A power source 152 such as a battery is electrically coupled to the PCB 150. The power source 152 may be a primary battery or a secondary battery such as a rechargeable battery. The secondary battery may be a lithium polymer or the like. The battery may have a capacity capable of generating 2 hours of light at high brightness and/or 20 hours of light when operating in a flashing mode on a single charge. The PCB 150 includes a charging port 143. The charging port 143 is electrically and mechanically coupled to the PCB 150. The charging port 143 may be a mini-USB, a micro-USB, or a USB-C type port. The charging port 143 enables the power source 152 to be charged from an external power source. The charging port 143 is accessible through an opening in the housing 110. A charging port cover 142 may be fitted to selectively close the opening in the housing 110. The charging port cover 142 may be made of a pliable material such that an interference fit may be achieved with the housing 110. A portion of the charging port cover 142 may be coupled to the housing 110 such that when the charging port cover 142 is removed from the opening in the housing 110, the charging port cover 142 remains attached to the housing 110.

The PCB 150 further includes one or more buttons 141 mechanically and electrically coupled to thereto. The one or more buttons 141 are configured to be actionable through the housing 110 by way of openings in the housing 110 and covered by one or more button covers 140. The button covers 140 may be may be made of a pliable material such that a force applied to the button covers 140 actuates the one or more buttons 141. The button covers 140 for each corresponding one or more buttons 141 for controlling operation of the first light source and the second light source may have different contours. For example, a first button cover corresponding to the button 141 for controlling operation of the first light source that illuminates the first portion 122 of the light emitting portion 120 may have a flat ring shaped contour that corresponds to the halo or ring shape of the first portion 122 of the light emitting portion 120 on the illumination device 100. Moreover, a second button cover corresponding to the button 141 for controlling operation of the second light source that illuminates the second portion 124 of the light emitting portion 120 may have a cylindrical protrusion contour that corresponds to the shape of a projected beam of light output by the second portion 124 of the light emitting portion 120 on the illumination device 100. The tactile contours of the button covers 140 enable a user without looking at the buttons, for example, when operating the illumination device 100 in the dark to readily ascertain which of the buttons corresponds to each of the first and second portions of the illumination device 100.

Actuating the one or more buttons 141 controls operation of the illumination device 100. For example, actuation of the one or more buttons 141 turns on or off the light emitting device D1 and/or changes the mode of the illumination of the light emitting device D1. Modes of illumination may include high brightness, medium brightness, low brightness, and/or a flashing mode. The brightness may change my change the power delivered to the light illuminating devices. For example, the light emitting devices may provide 75 lumens, 100 lumens, 150 lumens, 200 lumens, or any level between 75 and 200 lumens. Each brightness mode may be configured to provide a different lumen level. Modes of illumination may also include changing the color of the light emitted. In some embodiments, the light emitting device D1 may be configured cycle or morph from a first color to a second color. As used herein, the term morph refers to a gradual transition from one color or brightness to another.

The power source 152 may be mounted within the housing 110 and secured in place with a foam spacer 154 positioned between the PCB 150 and the power source 152. The PCB 150 may be fastened to the internal structure of the housing 110 by way of a screw 156 or other fastening element such as a heat stake or glue.

Referring to FIG. 6, the printed circuit board (PCB) 150 includes a plurality of light emitting devices D1-D7, one or more buttons 141 and a charging port 143. The structure depicted in FIG. 6 is similar to the structure of the illumination device 100 depicted and described with reference to FIG. 5. For conciseness, only differences between the illumination devices 100 of FIG. 5 and FIG. 6 will be described. The plurality of light emitting devices D1-D7 of the illumination device 100 in FIG. 6 are electrically coupled to the PCB 150. For example, a first light emitting device D1 (also referred to herein as the second light source for providing light to the second portion 124) may be centrally disposed on the PCB such that light illuminated from the first light emitting device D1 is emitted through the second portion 124 of the light illuminating portion 120. In some embodiments, the illumination device 100 includes a cone reflector 160 positioned around the first light emitting device D1 such that the light is focused through the second portion 124. The other light emitting devices D2-D7 (also referred to herein as the first light source for providing light to the first portion 122) may be positioned around the perimeter of the PCB such that light generated by the other light emitting devices D2-D7 is emitted through the first portion 122 of the light illuminating portion 120.

In embodiments, operation of the one or more buttons 141 causes circuitry on the PCB 150 to turn on or off one or more of the light emitting devices D1-D7. For example, operating a first button one time powers on one or more of the light emitting devices D1-D7 and begins rotation through various colors of light. The one or more of the light emitting devices D1-D7 include white LEDs and/or RGBW LEDs. Operating the first button two times may stop the color rotation of the LEDs on the current color. Operating the first button three times may power off the one or more of the light emitting devices D1-D7. Operating the second button one time may set the one or more of the light emitting devices D1-D7 to low brightness. Operating the second button two times sets the one or more of the light emitting devices D1-D7 to high brightness. Operating the second button three times sets the one or more of the light emitting devices D1-D7 to flash at high brightness. Operating the second button four times powers off the one or more of the light emitting devices D1-D7. Operating the buttons in rapid succession can cause one of a number various modes of illumination.

In another embodiment, operating the button 141 one time powers on the light emitting devices D1-D7 at low brightness. Operating the button 141 two times sets the light emitting devices D1-D7 to high brightness. Operating the button 141 three times sets the light emitting devices D1-D7 to flash at high brightness. Operating the button 141 four times powers off the light emitting devices D1-D7.

Implementation examples are described in the following numbered clauses:

An illumination device comprising a housing having a flared cylindrical bowl shape enclosed on a first end and open on an second end; a light emitting portion coupled to the housing on the second end, the light emitting portion comprising a first portion configured to diffuse light emitted through the first portion and a second portion configured to project light in a beam from the illumination device, the first portion encircles a perimeter of the second portion; a first light source comprising one or more light emitting devices that when activated provide light to the first portion; and a second light source distinct from the first light source that when activated provides light to the second portion.

The illumination device of any preceding clause, wherein the housing comprises a cutout portion extending from the second end along a length of the housing toward the first end, the first portion of the light emitting portion configured to enclose the cutout portion of the housing, and the first light source, when activated, provides light that is diffused by the first portion of the light emitting portion and illuminates through the cutout portion of the housing.

The illumination device of any preceding clause, wherein the cutout portion comprises a shape defined by at least one of a flame or one or more stars.

The illumination device of any preceding clause, further comprising a cone reflector configured to receive light from the second light source through an opening at a narrow end of the cone reflector and project the light generated by the second light source through the second portion of the light emitting portion.

The illumination device of any preceding clause, wherein the cone reflector is positioned within the housing to prevent light from the first light source to emit through the second portion of the light emitting portion and reflect light from the first light source outward and through the first portion.

The illumination device of any preceding clause, wherein the first light source generates a sequence of light comprising a plurality of colors.

The illumination device of any preceding clause, wherein the first light source generates one or more non-white colors of light and the second light source generates white light.

The illumination device of any preceding clause, further comprising a power source, a circuit board, and at least two buttons electrically coupled to the first light source and the second light source and disposed within the housing, wherein a first button of the at least two buttons is configured to control operation of the first light source, and a second button of the at least two buttons is configured to control operation of the second light source.

The illumination device of any preceding clause, wherein a first button cover corresponding to the first button comprises a contour of a flat ring shaped and a second button cover corresponding to the second button comprises a contour of a cylindrical protrusion.

The illumination device of any preceding clause, wherein activation of the first button controls operation of the first light source in a plurality of modes comprising: activating the first light source to cycle through a plurality of colors, causing the first light source to hold the cycling through the plurality of colors on a selected color, and deactivating the first light source.

The illumination device of any preceding clause, wherein activation of the second button controls operation of the second light source in a plurality of modes comprising at least one of: activating the second light source, activating the second light source to generate light at one or more different brightness levels through one or more depressions of the second button, causing the second light source to flash, or deactivating the second light source.

The illumination device of any preceding clause, further comprising an attachment mechanism coupled to the housing, the attachment mechanism configured to selectively fasten the illumination device to a device.

The illumination device of any preceding clause, wherein the first portion and the second portion comprise material for transmitting light, the first portion being less transparent than the second portion.

The illumination device of any preceding clause, wherein light projected through the second portion by the second light source forms a beam of light illuminating an area in a longitudinal direction from the illumination device, and light projected through the first portion by the first light source generates with the first portion an illuminated surface with a viewing angle along the longitudinal direction and radially extending from the longitudinal direction.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

The invention claimed is:

1. An illumination device comprising:
a housing having a flared cylindrical bowl shape enclosed on a first end and open on an second end, wherein a wall defining the flared cylindrical bowl shape of the housing comprises a cutout portion;
a light emitting portion coupled to the housing on the second end, the light emitting portion comprising a first portion configured to diffuse light emitted through the first portion and a second portion configured to project light in a beam from the illumination device, the first portion encircles a perimeter of the second portion, and the cutout portion is enclosed by a portion of the first portion such that at least some of the light diffused by the first portion is emittable through the cutout portion in the housing;
a first light source comprising one or more light emitting devices that when activated provide light to the first portion; and
a second light source distinct from the first light source that when activated provides light to the second portion.

2. The illumination device of claim 1, wherein:
the cutout portion extends from the second end along a length of the wall of the housing toward the first end, and
the first light source, when activated, provides light that is diffused by the first portion of the light emitting portion and illuminates through the cutout portion of the housing.

3. The illumination device of claim 2, wherein the cutout portion comprises a shape defined by at least one of a flame or one or more stars.

4. The illumination device of claim 1, further comprising a cone reflector configured to receive light from the second light source through an opening at a narrow end of the cone reflector and project the light generated by the second light source through the second portion of the light emitting portion.

5. The illumination device of claim 4, wherein the cone reflector is positioned within the housing to prevent light from the first light source to emit through the second portion of the light emitting portion and reflect light from the first light source outward and through the first portion.

6. The illumination device of claim 1, wherein the first light source generates a sequence of light comprising a plurality of colors.

7. The illumination device of claim 1, wherein the first light source generates one or more non-white colors of light and the second light source generates white light.

8. The illumination device of claim 1, further comprising a power source, a circuit board, and at least two buttons electrically coupled to the first light source and the second light source and disposed within the housing, wherein
a first button of the at least two buttons is configured to control operation of the first light source, and
a second button of the at least two buttons is configured to control operation of the second light source.

9. The illumination device of claim 8, wherein a first button cover corresponding to the first button comprises a contour of a flat ring shaped and a second button cover corresponding to the second button comprises a contour of a cylindrical protrusion.

10. The illumination device of claim 8, wherein activation of the first button controls operation of the first light source in a plurality of modes comprising:
activating the first light source to cycle through a plurality of colors,
causing the first light source to hold the cycling through the plurality of colors on a selected color, and
deactivating the first light source.

11. The illumination device of claim 8, wherein activation of the second button controls operation of the second light source in a plurality of modes comprising at least one of:
activating the second light source,
activating the second light source to generate light at one or more different brightness levels through one or more depressions of the second button,
causing the second light source to flash, or
deactivating the second light source.

12. The illumination device of claim 1, further comprising an attachment mechanism coupled to the housing, the attachment mechanism configured to selectively fasten the illumination device to a device.

13. The illumination device of claim 1, wherein the first portion and the second portion comprise material for transmitting light, the first portion being less transparent than the second portion.

14. The illumination device of claim 1, wherein:
light projected through the second portion by the second light source forms a beam of light illuminating an area in a longitudinal direction from the illumination device, and
light projected through the first portion by the first light source generates with the first portion an illuminated surface with a viewing angle along the longitudinal direction and radially extending from the longitudinal direction.

15. An illumination apparatus for selectively coupling to a transportation device comprising:
a housing having a flared cylindrical bowl shape enclosed on a first end and open on an second end, the housing comprises a cutout portion extending from the second end along a length of the housing toward the first end;
an attachment mechanism coupled to the housing, the attachment mechanism configured to selectively fasten the illumination apparatus to the transportation device;
a light emitting portion coupled to the housing on the second end, the light emitting portion comprising a first portion configured to diffuse light emitted through the first portion and a second portion configured to project light in a beam from the illumination apparatus, the first portion encircles a perimeter of the second portion, the first portion of the light emitting portion configured to enclose the cutout portion of the housing;
a first light source comprising one or more light emitting devices that when activated provide light to the first portion, the light that is diffused by the first portion of the light emitting portion and illuminates the cutout portion of the housing; and
a second light source distinct from the first light source that when activated provides light to the second portion.

16. The illumination apparatus of claim 15, further comprising a cone reflector configured to receive light from the second light source through an opening at a narrow end of the cone reflector and project the light generated by the second light source through the second portion of the light emitting portion.

17. The illumination apparatus of claim 16, wherein the cone reflector is positioned within the housing to prevent light from the first light source to emit through the second portion of the light emitting portion and reflect light from the first light source outward and through the first portion.

18. The illumination apparatus of claim 15, wherein the first light source generates one or more non-white colors of light and the second light source generates white light.

19. The illumination apparatus of claim 15, wherein:
light projected through the second portion by the second light source forms a beam of light illuminating an area in a longitudinal direction from the illumination apparatus, and
light projected through the first portion by the first light source generates with the first portion an illuminated surface with a viewing angle along the longitudinal direction and radially extending from the longitudinal direction.

20. The illumination apparatus of claim 15, wherein the first portion and the second portion comprise material for transmitting light, the first portion being less transparent than the second portion.

\* \* \* \* \*